(12) United States Patent
Trude et al.

(10) Patent No.: US 8,162,655 B2
(45) Date of Patent: Apr. 24, 2012

(54) SYSTEM AND METHOD FOR FORMING A CONTAINER HAVING A GRIP REGION

(75) Inventors: Gregory Trude, Seven Valleys, PA (US); Paul Kelley, Wrightsville, PA (US)

(73) Assignee: Graham Packaging Company, L.P., York, PA (US)

( * ) Notice: Subject to any disclaimer, the term of this patent is extended or adjusted under 35 U.S.C. 154(b) by 156 days.

(21) Appl. No.: 12/627,922

(22) Filed: Nov. 30, 2009

(65) Prior Publication Data

US 2010/0074983 A1    Mar. 25, 2010

Related U.S. Application Data

(62) Division of application No. 11/399,430, filed on Apr. 7, 2006.

(51) Int. Cl.
    *B29C 49/32* (2006.01)
(52) U.S. Cl. ........................................ 425/525; 425/522
(58) Field of Classification Search ............... 425/522, 425/525
    See application file for complete search history.

(56) References Cited

U.S. PATENT DOCUMENTS

| | | | |
|---|---|---|---|
| 1,499,239 A | 6/1924 | Malmquist | |
| D110,624 S | 7/1938 | Mekeel, Jr. | |
| 2,124,959 A | 7/1938 | Vogel | |
| 2,142,257 A | 1/1939 | Saeta | |
| 2,378,324 A | 6/1945 | Ray et al. | |
| 2,880,902 A | 4/1959 | Owsen | |
| 2,960,248 A | 11/1960 | Kuhlman | |
| 2,971,671 A | 2/1961 | Shakman | |
| 2,982,440 A | 5/1961 | Harrison | |
| 3,043,461 A | 7/1962 | Glassco | |
| 3,081,002 A | 3/1963 | Tauschinski et al. | |
| 3,090,478 A | 5/1963 | Stanley | |
| 3,142,371 A | 7/1964 | Rice et al. | |
| 3,174,655 A | 3/1965 | Hurschman | |
| 3,198,861 A | 8/1965 | Marvel | |
| 3,301,293 A | 1/1967 | Santelli | |
| 3,325,031 A | 6/1967 | Singier | |
| 3,397,724 A | 8/1968 | Bolen et al. | |
| 3,409,167 A | 11/1968 | Blanchard | |
| 3,417,893 A | 12/1968 | Liberman | |
| 3,426,939 A | 2/1969 | Young | |

(Continued)

FOREIGN PATENT DOCUMENTS

AU    2002257159 B2    4/2003

(Continued)

OTHER PUBLICATIONS

A certified of the file wrapper and contents of U.S. Appl. No. 60/220,326, filed Jul. 24, 2000 dated Oct. 29, 2008.

(Continued)

*Primary Examiner* — Robert B Davis
(74) *Attorney, Agent, or Firm* — Miles & Stockbridge P.C.

(57) ABSTRACT

A container forming assembly and method includes receiving a parison within a cavity of a mold, enclosing the parison within the mold having a wall with a recess, inflating the parison in the mold to form a blow molded container where the blow molded container has a sidewall, a movable region formed at the recess, and a hinge circumscribing an interface between the sidewall and the movable region, and moving the movable region toward an interior of the blow molded container about the hinge before filling.

20 Claims, 11 Drawing Sheets

U.S. PATENT DOCUMENTS

| | | | |
|---|---|---|---|
| 3,441,982 A * | 5/1969 | Tsukahara et al. | 425/525 |
| 3,468,443 A | 9/1969 | Marcus | |
| 3,483,908 A | 12/1969 | Donovan | |
| 3,485,355 A | 12/1969 | Stewart | |
| 3,693,828 A | 9/1972 | Kneusel et al. | |
| 3,704,140 A | 11/1972 | Petit et al. | |
| 3,727,783 A | 4/1973 | Carmichael | |
| 3,819,789 A | 6/1974 | Parker | |
| 3,904,069 A | 9/1975 | Toukmanian | |
| 3,918,920 A | 11/1975 | Barber | |
| 3,935,955 A | 2/1976 | Das | |
| 3,941,237 A | 3/1976 | MacGregor, Jr. | |
| 3,942,673 A | 3/1976 | Lyu et al. | |
| 3,949,033 A | 4/1976 | Uhlig | |
| 3,956,441 A | 5/1976 | Uhlig | |
| 4,036,926 A | 7/1977 | Chang | |
| 4,037,752 A | 7/1977 | Dulmaine et al. | |
| 4,117,062 A | 9/1978 | Uhlig | |
| 4,123,217 A | 10/1978 | Fischer et al. | |
| 4,125,632 A | 11/1978 | Vosti et al. | |
| 4,134,510 A | 1/1979 | Chang | |
| 4,158,624 A | 6/1979 | Ford et al. | |
| 4,170,622 A | 10/1979 | Uhlig | |
| 4,174,782 A | 11/1979 | Obsomer | |
| 4,219,137 A | 8/1980 | Hutchens | |
| 4,231,483 A | 11/1980 | Dechenne et al. | |
| 4,247,012 A | 1/1981 | Alberghini | |
| 4,301,933 A | 11/1981 | Yoshino | |
| 4,318,489 A | 3/1982 | Snyder et al. | |
| 4,318,882 A | 3/1982 | Agrawal et al. | |
| 4,338,765 A | 7/1982 | Ohmori et al. | |
| 4,355,728 A | 10/1982 | Ota et al. | |
| 4,377,191 A | 3/1983 | Yamaguchi | |
| 4,378,328 A | 3/1983 | Przytulla et al. | |
| 4,381,061 A | 4/1983 | Cerny et al. | |
| D269,158 S | 5/1983 | Gaunt | |
| 4,386,701 A | 6/1983 | Galer | |
| 4,436,216 A | 3/1984 | Chang | |
| 4,444,308 A | 4/1984 | MacEwen | |
| 4,450,878 A | 5/1984 | Takada et al. | |
| 4,465,199 A | 8/1984 | Aoki | |
| 4,497,855 A | 2/1985 | Agrawal et al. | |
| 4,525,401 A | 6/1985 | Pocock et al. | |
| 4,542,029 A | 9/1985 | Caner et al. | |
| 4,610,366 A | 9/1986 | Estes et al. | |
| 4,628,669 A | 12/1986 | Herron et al. | |
| 4,642,968 A | 2/1987 | McHenry et al. | |
| 4,645,078 A | 2/1987 | Reyner | |
| 4,667,454 A | 5/1987 | McHenry et al. | |
| 4,684,025 A | 8/1987 | Copland et al. | |
| 4,685,273 A | 8/1987 | Caner et al. | |
| D292,378 S | 10/1987 | Brandt et al. | |
| 4,723,661 A | 2/1988 | Hoppmann et al. | |
| 4,724,855 A | 2/1988 | Jackson et al. | |
| 4,747,507 A | 5/1988 | Fitzgerald et al. | |
| 4,749,092 A | 6/1988 | Sugiura et al. | |
| 4,769,206 A * | 9/1988 | Reymann et al. | 264/534 |
| 4,773,458 A | 9/1988 | Touzani | |
| 4,785,949 A | 11/1988 | Krishnakumar et al. | |
| 4,785,950 A | 11/1988 | Miller et al. | |
| 4,807,424 A | 2/1989 | Robinson et al. | |
| 4,813,556 A | 3/1989 | Lawrence | |
| 4,831,050 A | 5/1989 | Cassidy et al. | |
| 4,836,398 A | 6/1989 | Leftault, Jr. et al. | |
| 4,840,289 A | 6/1989 | Fait et al. | |
| 4,850,493 A | 7/1989 | Howard, Jr. | |
| 4,850,494 A | 7/1989 | Howard, Jr. | |
| 4,865,206 A | 9/1989 | Behm et al. | |
| 4,867,323 A | 9/1989 | Powers | |
| 4,880,129 A | 11/1989 | McHenry et al. | |
| 4,887,730 A | 12/1989 | Touzani | |
| 4,892,205 A | 1/1990 | Powers et al. | |
| 4,896,205 A | 1/1990 | Weber | |
| 4,921,147 A | 5/1990 | Poirier | |
| 4,962,863 A | 10/1990 | Wendling et al. | |
| 4,967,538 A | 11/1990 | Leftault, Jr. et al. | |
| 4,978,015 A | 12/1990 | Walker | |
| 4,997,692 A | 3/1991 | Yoshino | |
| 5,004,109 A | 4/1991 | Bartley et al. | |
| 5,005,716 A | 4/1991 | Eberle | |
| 5,014,868 A | 5/1991 | Wittig et al. | |
| 5,024,340 A | 6/1991 | Alberghini et al. | |
| 5,033,254 A | 7/1991 | Zenger | |
| 5,060,453 A | 10/1991 | Alberghini et al. | |
| 5,067,622 A | 11/1991 | Garver et al. | |
| 5,090,180 A | 2/1992 | Sorensen | |
| 5,092,474 A | 3/1992 | Leigner | |
| 5,122,327 A * | 6/1992 | Spina et al. | 264/534 |
| 5,133,468 A | 7/1992 | Brunson et al. | |
| 5,141,121 A | 8/1992 | Brown et al. | |
| 5,178,290 A | 1/1993 | Ota et al. | |
| 5,199,587 A | 4/1993 | Ota et al. | |
| 5,199,588 A | 4/1993 | Hayashi | |
| 5,201,438 A | 4/1993 | Norwood | |
| 5,217,737 A | 6/1993 | Gygax et al. | |
| 5,234,126 A | 8/1993 | Jonas et al. | |
| 5,244,106 A | 9/1993 | Takacs | |
| 5,251,424 A | 10/1993 | Zenger et al. | |
| 5,255,889 A | 10/1993 | Collette et al. | |
| 5,261,544 A | 11/1993 | Weaver, Jr. | |
| 5,279,433 A | 1/1994 | Krishnakumar et al. | |
| 5,281,387 A | 1/1994 | Collette et al. | |
| 5,310,043 A | 5/1994 | Alcorn | |
| 5,333,761 A | 8/1994 | Davis et al. | |
| 5,341,946 A | 8/1994 | Vailliencourt et al. | |
| 5,392,937 A | 2/1995 | Prevot et al. | |
| 5,411,699 A | 5/1995 | Collette et al. | |
| 5,454,481 A | 10/1995 | Hsu | |
| 5,472,105 A | 12/1995 | Krishnakumar et al. | |
| 5,472,181 A | 12/1995 | Lowell | |
| RE35,140 E | 1/1996 | Powers, Jr. | |
| 5,484,052 A | 1/1996 | Pawloski et al. | |
| 5,503,283 A | 4/1996 | Semersky | |
| 5,543,107 A | 8/1996 | Malik et al. | |
| 5,593,063 A | 1/1997 | Claydon et al. | |
| 5,598,941 A | 2/1997 | Semersky et al. | |
| 5,632,397 A | 5/1997 | Fandeux et al. | |
| 5,642,826 A | 7/1997 | Melrose | |
| 5,672,730 A | 9/1997 | Cottman | |
| 5,687,874 A | 11/1997 | Omori et al. | |
| 5,690,244 A | 11/1997 | Darr | |
| 5,704,504 A | 1/1998 | Bueno | |
| 5,713,480 A | 2/1998 | Petre et al. | |
| 5,730,314 A | 3/1998 | Wiemann et al. | |
| 5,730,914 A | 3/1998 | Ruppman, Sr. | |
| 5,735,420 A | 4/1998 | Nakamaki et al. | |
| 5,737,827 A | 4/1998 | Kuse et al. | |
| 5,758,802 A | 6/1998 | Wallays | |
| 5,762,221 A | 6/1998 | Tobias et al. | |
| 5,780,130 A | 7/1998 | Hansen et al. | |
| 5,785,197 A | 7/1998 | Slat | |
| 5,819,507 A | 10/1998 | Kaneko et al. | |
| 5,829,614 A | 11/1998 | Collette et al. | |
| 5,860,556 A | 1/1999 | Robbins, III | |
| 5,887,739 A | 3/1999 | Prevot et al. | |
| 5,888,598 A | 3/1999 | Brewster et al. | |
| 5,897,090 A | 4/1999 | Smith et al. | |
| 5,906,286 A | 5/1999 | Matsuno et al. | |
| 5,908,128 A | 6/1999 | Krishnakumar et al. | |
| D415,030 S | 10/1999 | Searle | |
| 5,971,184 A | 10/1999 | Krishnakumar et al. | |
| 5,976,653 A | 11/1999 | Collette et al. | |
| RE36,639 E | 4/2000 | Okhai | |
| 6,065,624 A | 5/2000 | Steinke | |
| 6,068,110 A | 5/2000 | Kumakiri et al. | |
| 6,074,596 A | 6/2000 | Jacquet | |
| 6,077,554 A | 6/2000 | Wiemann et al. | |
| 6,105,815 A | 8/2000 | Mazda | |
| 6,213,325 B1 | 4/2001 | Cheng et al. | |
| 6,217,818 B1 | 4/2001 | Collette et al. | |
| 6,228,317 B1 | 5/2001 | Smith et al. | |
| 6,230,912 B1 | 5/2001 | Rashid | |
| 6,277,321 B1 | 8/2001 | Vailliencourt et al. | |
| 6,298,638 B1 | 10/2001 | Bettle | |
| 6,375,025 B1 | 4/2002 | Mooney | |
| 6,390,316 B1 | 5/2002 | Mooney | |
| 6,413,466 B1 | 7/2002 | Boyd et al. | |

| | | | | | | |
|---|---|---|---|---|---|---|
| 6,439,413 | B1 | 8/2002 | Prevot et al. | FR | 1571499 | 6/1969 |
| 6,467,639 | B2 | 10/2002 | Mooney | FR | 2607109 | 5/1988 |
| 6,485,669 | B1 | 11/2002 | Boyd et al. | GB | 781103 | 8/1957 |
| 6,502,369 | B1 | 1/2003 | Andison et al. | GB | 1113988 | 5/1968 |
| 6,514,451 | B1 | 2/2003 | Boyd et al. | GB | 2050919 A | 1/1981 |
| 6,585,124 | B2 | 7/2003 | Boyd et al. | GB | 2372977 A | 9/2002 |
| 6,595,380 | B2 | 7/2003 | Silvers | JP | 48-31050 | 4/1973 |
| 6,612,451 | B2 | 9/2003 | Tobias et al. | JP | 49-28628 | 7/1974 |
| 6,662,960 | B2 | 12/2003 | Hong et al. | JP | 54-72181 A | 6/1979 |
| 6,749,075 | B2 * | 6/2004 | Bourque et al. ............ 215/384 | JP | 56-72730 U | 6/1981 |
| 6,749,780 | B2 | 6/2004 | Tobias | JP | 57-37827 U | 2/1982 |
| 6,763,968 | B1 | 7/2004 | Boyd et al. | JP | 57-210829 A | 12/1982 |
| 6,769,561 | B2 | 8/2004 | Futral et al. | JP | 63-189224 A | 8/1988 |
| 6,779,673 | B2 | 8/2004 | Melrose et al. | JP | 3-43342 A | 2/1991 |
| 6,923,334 | B2 | 8/2005 | Melrose et al. | JP | 03-076625 | 4/1991 |
| 6,942,116 | B2 | 9/2005 | Lisch et al. | JP | 5-193694 | 8/1993 |
| 6,983,858 | B2 | 1/2006 | Slat et al. | JP | 6-336238 A | 12/1994 |
| 7,051,073 | B1 | 5/2006 | Dutta | JP | 07-300121 A | 11/1995 |
| 7,051,889 | B2 | 5/2006 | Boukobza | JP | 08-244747 A | 9/1996 |
| D522,368 | S | 6/2006 | Darr et al. | JP | 8-253220 A | 10/1996 |
| 7,073,675 | B2 | 7/2006 | Trude | JP | 8-282633 A | 10/1996 |
| 7,077,279 | B2 | 7/2006 | Melrose | JP | 09-039934 A | 2/1997 |
| 7,137,520 | B1 | 11/2006 | Melrose | JP | 9-110045 A | 4/1997 |
| 7,150,372 | B2 | 12/2006 | Lisch et al. | JP | 09039934 A | 10/1997 |
| 7,159,374 | B2 | 1/2007 | Abercrombie, III et al. | JP | 10-167226 A | 6/1998 |
| 7,543,713 | B2 | 6/2009 | Trude et al. | JP | 10181734 A | 7/1998 |
| 7,735,304 | B2 | 6/2010 | Kelley et al. | JP | 10230919 A | 9/1998 |
| 7,799,264 | B2 | 9/2010 | Trude | JP | 11-218537 A | 8/1999 |
| 2001/0035391 | A1 | 11/2001 | Young et al. | JP | 2000229615 | 8/2000 |
| 2002/0074336 | A1 | 6/2002 | Silvers | JP | 2002-127237 A | 5/2002 |
| 2002/0096486 | A1 | 7/2002 | Bourque et al. | JP | 2004-026307 A | 1/2004 |
| 2002/0153343 | A1 | 10/2002 | Tobias et al. | JP | 2006-501109 | 1/2006 |
| 2002/0158038 | A1 | 10/2002 | Heisel et al. | JP | 2007-216981 A | 8/2007 |
| 2003/0015491 | A1 | 1/2003 | Melrose et al. | NZ | 240448 | 6/1995 |
| 2003/0186006 | A1 | 10/2003 | Schmidt et al. | NZ | 296014 | 10/1998 |
| 2003/0196926 | A1 | 10/2003 | Tobias et al. | NZ | 335565 | 10/1999 |
| 2003/0217947 | A1 | 11/2003 | Ishikawa et al. | NZ | 506684 | 9/2001 |
| 2004/0016716 | A1 | 1/2004 | Melrose et al. | NZ | 512423 | 9/2001 |
| 2004/0074864 | A1 | 4/2004 | Melrose et al. | NZ | 521694 | 10/2003 |
| 2004/0149677 | A1 | 8/2004 | Slat et al. | WO | WO 93/09031 A1 | 5/1993 |
| 2004/0173565 | A1 | 9/2004 | Semersky et al. | WO | WO 93/12975 A1 | 7/1993 |
| 2004/0211746 | A1 | 10/2004 | Trude | WO | WO 94/05555 | 3/1994 |
| 2005/0211662 | A1 | 9/2005 | Eaton et al. | WO | WO 97/03885 | 2/1997 |
| 2006/0006133 | A1 | 1/2006 | Lisch et al. | WO | WO 97/14617 | 4/1997 |
| 2006/0138074 | A1 | 6/2006 | Melrose | WO | WO 97/34808 A1 | 9/1997 |
| 2006/0231985 | A1 | 10/2006 | Kelley | WO | WO 99/21770 | 5/1999 |
| 2006/0243698 | A1 | 11/2006 | Melrose | WO | WO 00/38902 A1 | 7/2000 |
| 2006/0255005 | A1 | 11/2006 | Melrose et al. | WO | WO 00/51895 A1 | 9/2000 |
| 2006/0261031 | A1 | 11/2006 | Melrose | WO | WO 01/12531 A1 | 2/2001 |
| 2007/0017892 | A1 | 1/2007 | Melrose | WO | WO 01/40081 A1 | 6/2001 |
| 2007/0045312 | A1 | 3/2007 | Abercrombie, III et al. | WO | WO 02/02418 A1 | 1/2002 |
| 2007/0051073 | A1 | 3/2007 | Kelley et al. | WO | WO 02/18213 A1 | 3/2002 |
| 2007/0084821 | A1 | 4/2007 | Bysick et al. | WO | WO 02/085755 | 10/2002 |
| 2007/0125742 | A1 | 6/2007 | Simpson, Jr. et al. | WO | WO 2004/028910 A1 | 4/2004 |
| 2007/0125743 | A1 | 6/2007 | Pritchett, Jr. et al. | WO | WO 2004/106176 A2 | 9/2004 |
| 2007/0181403 | A1 | 8/2007 | Sheets et al. | WO | WO 2004/106175 A1 | 12/2004 |
| 2007/0199915 | A1 | 8/2007 | Denner et al. | WO | WO 2005/012091 A2 | 2/2005 |
| 2007/0199916 | A1 | 8/2007 | Denner et al. | WO | WO 2005/087628 A1 | 9/2005 |
| 2007/0215571 | A1 | 9/2007 | Trude | WO | WO 2006/113428 A3 | 10/2006 |
| 2007/0235905 | A1 | 10/2007 | Trude et al. | WO | WO 2007/127337 A2 | 11/2007 |
| 2008/0047964 | A1 | 2/2008 | Denner et al. | | | |
| 2008/0156847 | A1 | 7/2008 | Hawk et al. | | | |
| 2009/0202766 | A1 | 8/2009 | Beuerle et al. | | | |

FOREIGN PATENT DOCUMENTS

| | | |
|---|---|---|
| CA | 2077717 A1 | 3/1993 |
| DE | 1761753 | 1/1972 |
| DE | P2102319.8 | 8/1972 |
| DE | 3215866 A1 | 11/1983 |
| EP | 225155 A2 | 6/1987 |
| EP | 0 346 518 A1 | 12/1989 |
| EP | 0 505 054 A1 | 9/1992 |
| EP | 0521642 | 1/1993 |
| EP | 0 551 788 A1 | 7/1993 |
| EP | 0666222 A1 | 8/1995 |
| EP | 0 609 348 B1 | 2/1997 |
| EP | 0916406 A2 | 5/1999 |
| EP | 0957030 A2 | 11/1999 |
| EP | 1 063 076 A1 | 12/2000 |

OTHER PUBLICATIONS

Final Office Action for U.S. Appl. No. 10/558,284 dated Sep. 9, 2008.
Office Action for U.S. Appl. No. 10/558,284 dated Jan. 25, 2008.
Office Action for U.S. Appl. No. 10/851,083 dated Nov. 28, 2008.
Final Office Action for U.S. Appl. No. 10/851,083 dated Jun. 12, 2008.
Office Action for U.S. Appl. No. 10/851,083 dated Sep. 6, 2007.
International Search Report for PCT/US2005/008374 dated Aug. 2, 2005.
IPRP (including Written Opinion) for PCT/US2005/008374 dated Sep. 13, 2006.
International Search Report for PCT/US2004/016405 dated Feb. 15, 2005.
IPRP (including Written Opinion) for PCT/US2004/016405 dated Nov. 25, 2005.
Office Action for Application No. EP 06 750 165.0-2307 dated Nov. 24, 2008.

International Search Report for PCT/US2006/040361 dated Feb. 26, 2007.
IPRP (including Written Opinion) for PCT/US2006/040361 dated Apr. 16, 2008.
International Search Report for PCT/US2007/006318 dated Sep. 11, 2007.
IPRP (including Written Opinion) PCT/US2007/006318 dated Sep. 16, 2008.
IPRP (including Written Opinion) PCT/US2006/014055 dated Oct. 16, 2007.
International Search Report for PCT/US2004/024581 dated Jul. 25, 2005.
IPRP (including Written Opinion) for PCT/US2004/024581 dated Jan. 30, 2006.
Official Notification for counterpart Japanese Application No. 2006-522084 dated May 19, 2009.
Examination Report for counterpart New Zealand Application No. 545528 dated Jul. 1, 2008.
Examination Report for counterpart New Zealand Application No. 569422 dated Jul. 1, 2008.
Examination Report for New Zealand Application No. 550336 dated Mar. 26, 2009.
Examination Report for counterpart New Zealand Application No. 545528 dated Sep. 20, 2007.
Examination Report for counterpart New Zealand Application No. 569422 dated Sep. 29, 2009.
Office Action for U.S. Appl. No. 11/249,342 dated Jun. 10, 2009.
Office Action for U.S. Appl. No. 11/249,342 dated Jan. 12, 2010.
Office Action for Chinese Application No. 2006800380748 dated Jul. 10, 2009.
Examiner's Report for Australian Application No. 2006236674 dated Sep. 18, 2009.
Office Action for Chinese Application No. 200680012360.7 dated Jul. 10, 2009.
Examination Report for New Zealand Application No. 563134 dated Aug. 3, 2009.
Office Action for U.S. Appl. No. 11/375,040 dated Dec. 1, 2009.
Office Action for European Application No. 07752979.0-2307 dated Aug. 21, 2009.
Final Office Action for U.S. Appl. No. 10/566,294 dated Sep. 10, 2009.
Office Action for U.S. Appl. No. 10/566,294 dated Apr. 21, 2009.
Final Office Action for U.S. Appl. No. 10/566,294 dated Feb. 13, 2009.
Office Action for U.S. Appl. No. 10/566,294 dated Oct. 27, 2008.
Office Action for U.S. Appl. No. 11/399,420 dated Sep. 4, 2009.
International Search Report and Written Opinion dated Mar. 15, 2010 for PCT/US2010/020045.
International Search Report and Written Opinion dated Sep. 8, 2009 for PCT/US2009/051023.
Office Action dated Oct. 26, 2010, U.S. Appl. No. 11/362,416.
Office Action dated Feb. 2, 2011, U.S. Appl. No. 11/399,430.
Office Action dated Aug. 5, 2010, U.S. Appl. No. 11/399,430.
European Search Report for EPA 10185697.9 dated Mar. 21, 2011.
Chanda, M. & Roy, Salil K., Plastics Technology Handbook, 2007, CRC Press, pp. 2-34-2-37.
Final Office Action dated Feb. 22, 2010, U.S. Appl. No. 11/399,430.
Office Action dated Sep. 4, 2009, U.S. Appl. No. 11/399,430.
Office Action dated Jun. 19, 2009, U.S. Appl. No. 11/399,430.
Final Office Action dated May 7, 2010, U.S. Appl. No. 11/362,416.
Office Action dated Oct. 2, 2009, U.S. Appl. No. 11/362,416.
Office Action dated Jun. 16, 2009, U.S. Appl. No. 11/362,416.
Office Action dated Feb. 3, 2010 for Canadian Application No. 2,604,231.
Communication dated Mar. 9, 2010 for European Application No. 09 173 607.4 enclosing European search report and European search opinion dated Feb. 25, 2010.

* cited by examiner

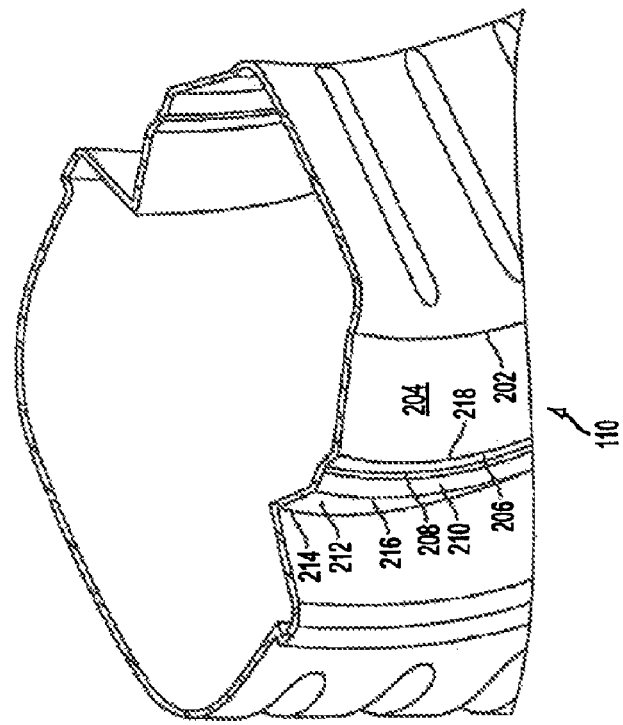
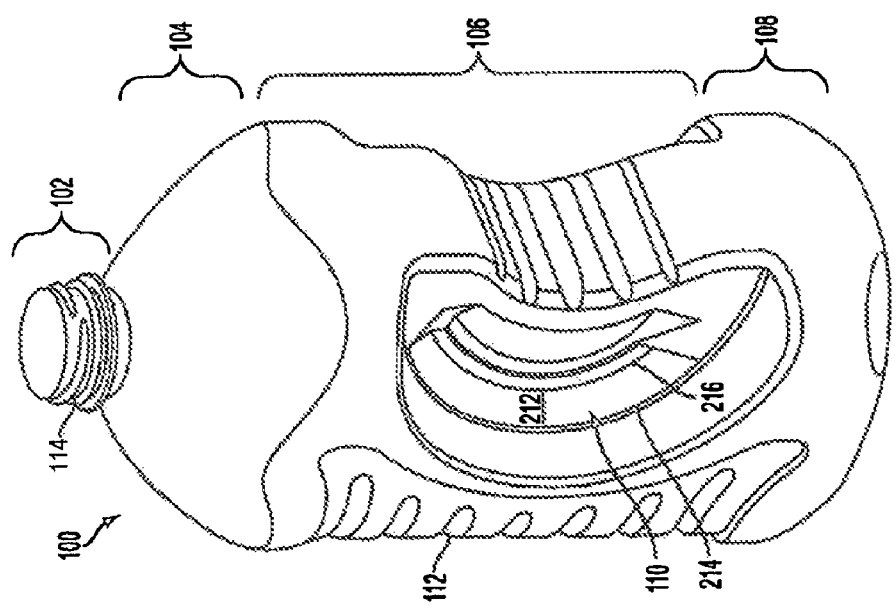
FIG. 2
FIG. 1

SYSTEM AND METHOD FOR FORMING A CONTAINER HAVING A GRIP REGION

CROSS-REFERENCE TO RELATED APPLICATION

This application is a division of application Ser. No. 11/399,430 filed Apr. 7, 2006, the subject matter of which is hereby incorporated by reference in its entirety.

BACKGROUND OF THE INVENTION

1. Field of the Invention

The invention generally relates to a method for blow molding a container, and more particularly to a method for blow molding a container to be formed with deep-set grips so that the formed container has secure grippability along with a good ergonomic feel.

2. Related Art

One method of manufacturing containers is through a process known as stretch blow molding. In this process, a preformed parison, or preform, is prepared from a thermoplastic material, typically by an injection molding process. The preform typically includes a threaded end, which becomes the threads of the container. During stretch blow molding, the preform is positioned between two open blow mold halves. The blow mold halves close about the preform and cooperate to provide a cavity into which the preform is blown to form the container. Once the mold is closed, a gas is forced into the perform causing it to stretch and to take the shape of the mold as the plastic contacts the mold. After molding, the mold halves open to release the blow molded container.

One problem with stretch blow molding is that stretching of the plastic material may affect the performance of the container at certain areas. While the stretching of the plastic material may not cause problems for most sections of the container, it particularly affects the ability of the plastic material to form around a deep protrusion in the mold. In some applications of container manufacturing, a deep protrusion may be required to form a particular section of a container. For example, the particular sections of the container formed by an inset or deep protrusion may include the dome, sidewalls, and the base of the container. As the plastic contacts the deep protrusion of the mold, the plastic must stretch and flow around the protrusion into a recess. However, the plastic material is less able to flow and stretch around the protrusion because of the contact friction with the mold surface. Insufficient material distribution at a region, such as at the base, may affect the ability of the region to maintain its shape around the protrusion during hot filling, the strength of the region, or the ability of the container to stand on a flat surface.

A lack of definition in the base caused by the inability of the plastic to properly form at a deep protrusion is a particular problem. While this is a particular problem in the base region, similar problems exist in other regions of a container where an inset is positioned. As stated previously, these other regions formed with an inset or deep protrusion include the dome, the sidewalls, etc. of a container. These problems can exist with any forming process, such as blow molding, where material must flow around a protrusion of a mold to form an inset region of a container. This is particularly true for blow molding processes including stretch blow molding, extrusion blow molding and injection blow molding.

Some containers have deep-set grips on either side of the bottle so that a consumer can easily pick up the filled container with a firm grasp of his/her hand. When blowing deep-set grips with known blow molding processes, plastic material becomes trapped in the grip regions consequently starving other regions of the container of material. To account for this, the container weight is increased as more material is required to be used to ensure that a sufficient amount of material is provided for all parts of the container. Alternatively, design compromises are made so that the resultant thinner regions are closer to the axis of the container causing those regions to be blown with more material. However, blowing heavier containers and the resultant design constraints do not solve the problem described above.

What is needed is an improved method of forming a container with a deep-set protrusion (e.g., in the base and/or as a grip) that overcomes the shortcomings of conventional solutions that introduce additional costs, molding time, and complexity into the mold setup.

BRIEF SUMMARY OF THE INVENTION

One aspect of the invention is to create a deep-set grip in a container that provides secure grippability along with a good ergonomic feel in the resultant container. In a preferred embodiment, the deep-set grip is achieved in a manner to maintain the overall container weight at an as minimal a weight as possible, and to allow for a wide range of design applications.

The invention includes a container forming assembly including a mold having a sidewall with a recess, and a method for making the container.

A method according to exemplary embodiments of the invention includes receiving a parison, enclosing the parison within a mold having a wall with a recess, inflating the parison into the mold to form a blow molded container where the blow molded container has a sidewall, a movable region formed at the recess that extends outward from the container, and a hinge circumscribing an interface between the sidewall and the movable region, and moving the movable region about the hinge before filling the blow molded container with liquid or other consumable product.

A container forming assembly according to an exemplary embodiment of the invention forms a container from a parison where the container has at least one movable gripping region. The container forming assembly includes a mold adapted to form a first portion and a second portion of the at least one movable gripping region wherein the first portion is rotatable about a first hinge toward an interior of the container, the first hinge being formed at a first seam between the first portion and the container, and said second portion is rotatable about a second hinge toward the interior of the container, the second hinge being formed at a second seam between the second portion and the container; and a drive mechanism adapted to move the mold to enclose the parison during blow molding and to release the container after blow molding.

Another exemplary method according to the invention is directed to a method for increasing crystallinity of a blow molded container. This exemplary method includes inflating a parison in a mold having a wall with a recess to form a blow molded container having a movable gripping region, the movable gripping region being formed at the recess, the blow molded container having a hinge coupled to said movable gripping region, the hinge circumscribing an interface between the blow molded container and the movable gripping region; and moving the movable gripping region about said hinge toward an interior of said blow molded container before filling the blow molded container.

The container forming assembly according to another exemplary embodiment would include a first mold half forming a first movable gripping region and a second mold half forming a second movable gripping region where the second movable gripping region has hinges, rotatable portions and the structure of the first movable gripping region.

In the exemplary embodiment, each of the first and second mold halves have a recess forming a movable gripping portion forming region that includes a first surface adapted to form a first outer grip portion of the movable gripping region, a second surface adapted to form a second outer grip portion of the movable gripping region, a third surface adapted to form a first inner grip portion of the movable gripping region, a fourth surface adapted to form a second inner grip portion of the movable grip portion; and a fifth surface area adapted to form a ridge area of the movable gripping portion.

The container forming assembly of the foregoing exemplary embodiment may further have its fifth surface area positioned between the third and fourth surfaces, and wherein the third and fourth surfaces positioned adjacent to the first and second surfaces, respectively.

Further advantages, as well as the structure and function of exemplary embodiments will become apparent from a consideration of the description, drawings, and examples.

BRIEF DESCRIPTION OF THE DRAWINGS

The foregoing and other features and advantages of the invention will be apparent from the following, more particular description of exemplary embodiments of the invention, as illustrated in the accompanying drawings, wherein like reference numbers may generally indicate identical, functionally similar, and/or structurally similar elements.

FIG. 1 depicts an exemplary embodiment of a first stage of a container with the deep-set grip inverted, according to the present invention;

FIG. 2 depicts a cross sectional view of the exemplary container of FIG. 1 according to the present invention;

Further objectives and advantages, as well as the structure and function of exemplary embodiments will become apparent from a consideration of the description, drawings, and examples.

DETAILED DESCRIPTION OF THE INVENTION

Exemplary embodiments of the invention are discussed in detail below. In describing the exemplary embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations may be used without parting from the spirit and scope of the invention. All references cited herein are incorporated by reference as if each had been individually incorporated.

Figure 4:
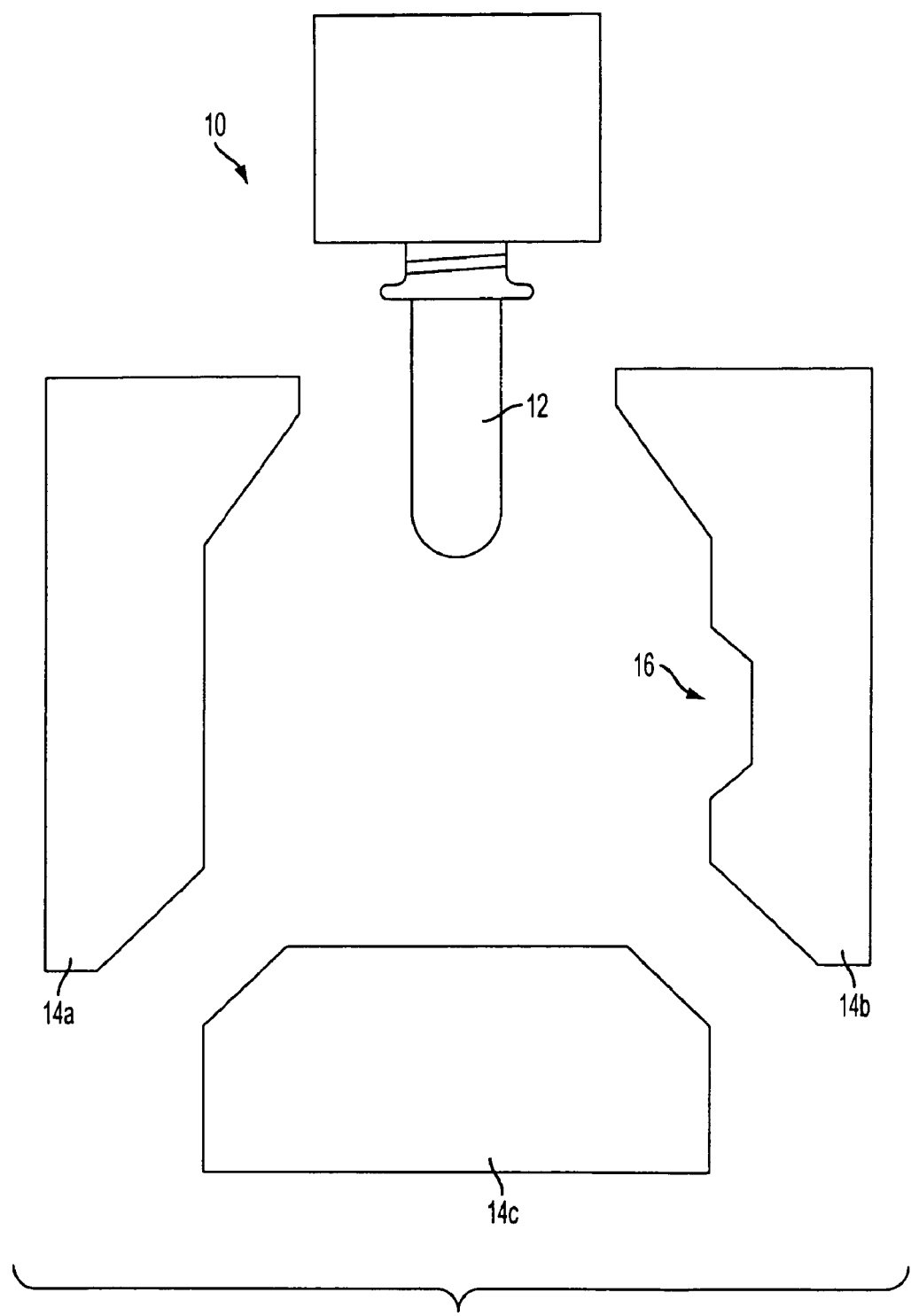
FIG. 4 illustrates a parison received before a mold according to an exemplary embodiment of the invention.

Exemplary embodiments of the present invention may generally relate to a container, a method of inverting a grip of a container, and a blow molding apparatus for forming a container having an invertible grip. In an exemplary embodiment, as shown in FIG. 4, a blow-molding apparatus 10 may receive a parison 12 and enclose the parison with a mold 14a-c, which may include a recess 16 in the outer surface of the mold 14b. The blow-molding apparatus 10 may inflate the parison into the mold to form a blow molded container 100 (see FIG. 5). The blow molded container 100 may have a sidewall, a movable region 18 formed at the recess 16, and a hinge circumscribing an interface between the sidewall of container 100 and the movable region 18. The blow-molding apparatus may be adapted to move the movable region 18 about the hinge before filling the blow molded container 100. An internal volume of the blow molded container may be reduced by moving the movable region 18 into the center of the container 100 (arrow 22 in FIGS. 6 and 7A) as schematically shown in FIG. 7C. The movable region 18 may form a grip for the container 100. By blow molding the movable region 18 or grip in its outward position (outside the container) and then inverting the movable region to form the grip by using a simple mechanical force, the weight of the container may be reduced and the definition of the grip may be improved.

Figure 3A:
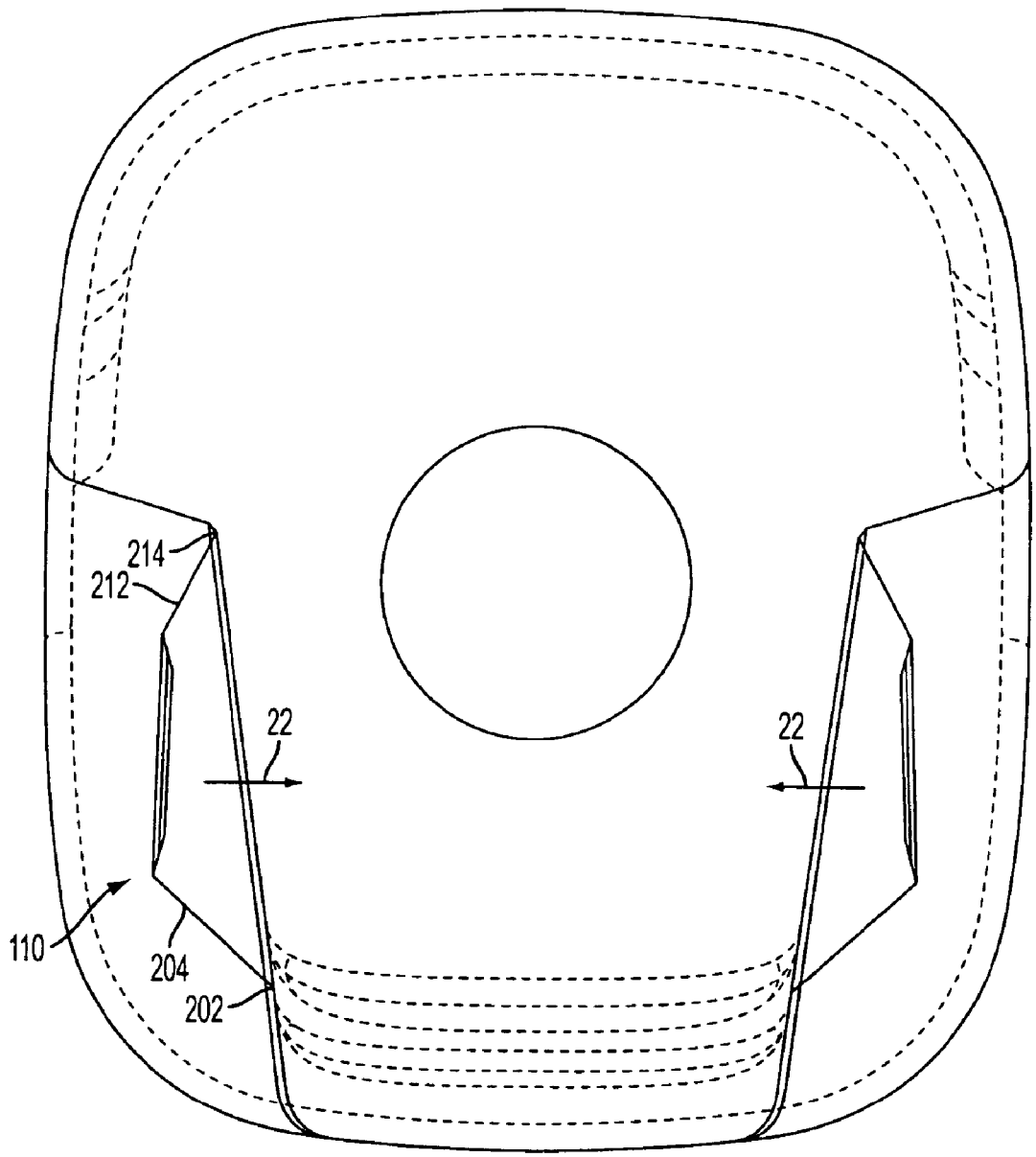
FIGS. 3A-B depict an exemplary embodiment inverting a grip of a container according to the present invention.
Figure 3B:
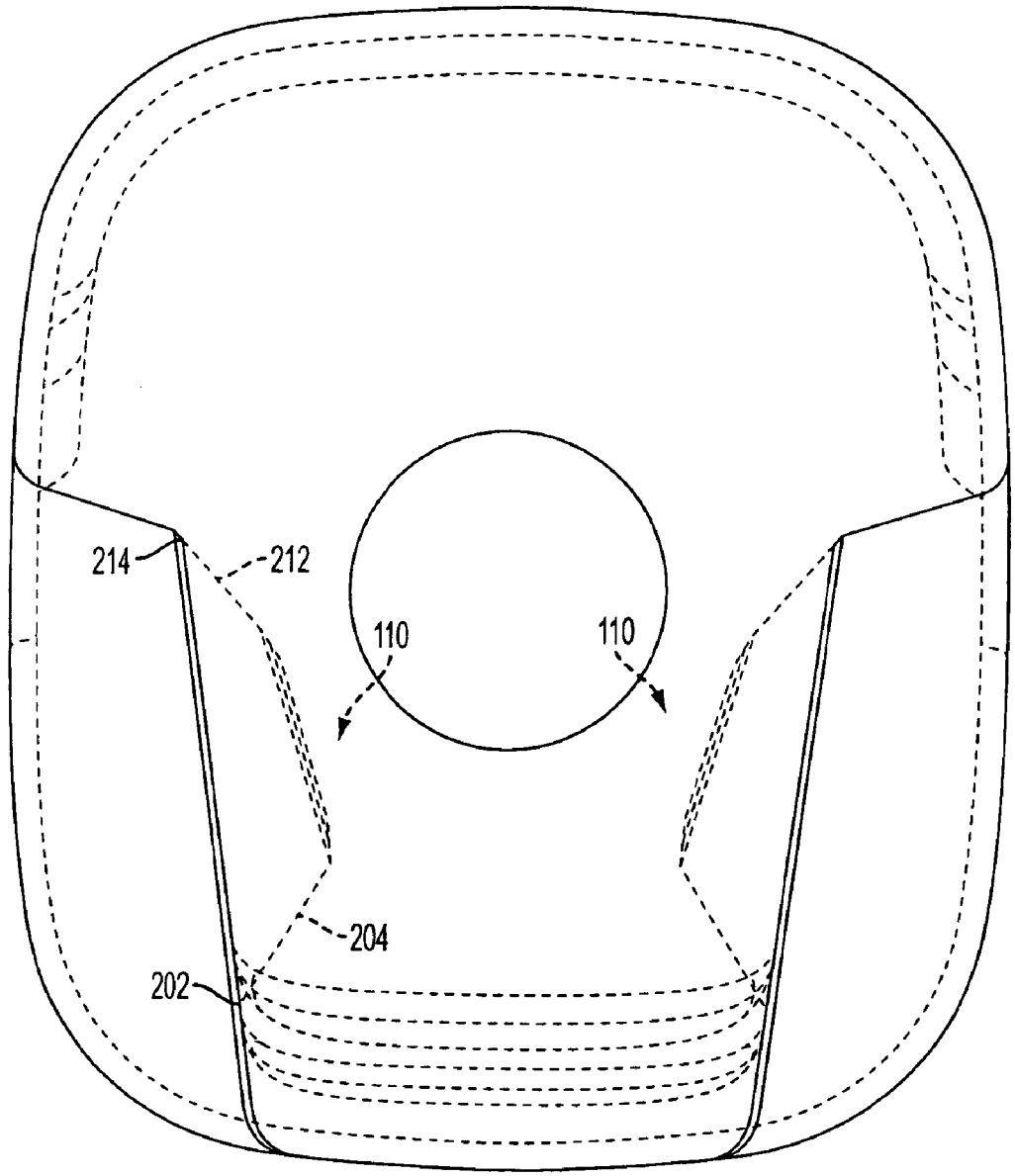

FIG. 1 illustrates an exemplary embodiment of a container representing the shape of the container as stretch blow molded according to the present invention, FIG. 2 illustrates an exemplary embodiment of a movable region of a container in its outwardly blown position according to the present invention, and FIGS. 3A-B illustrate an exemplary embodiment of the movable region of a container in its outwardly blown position and the final configuration of the grip according to the present invention, respectively.

Figure 7A:
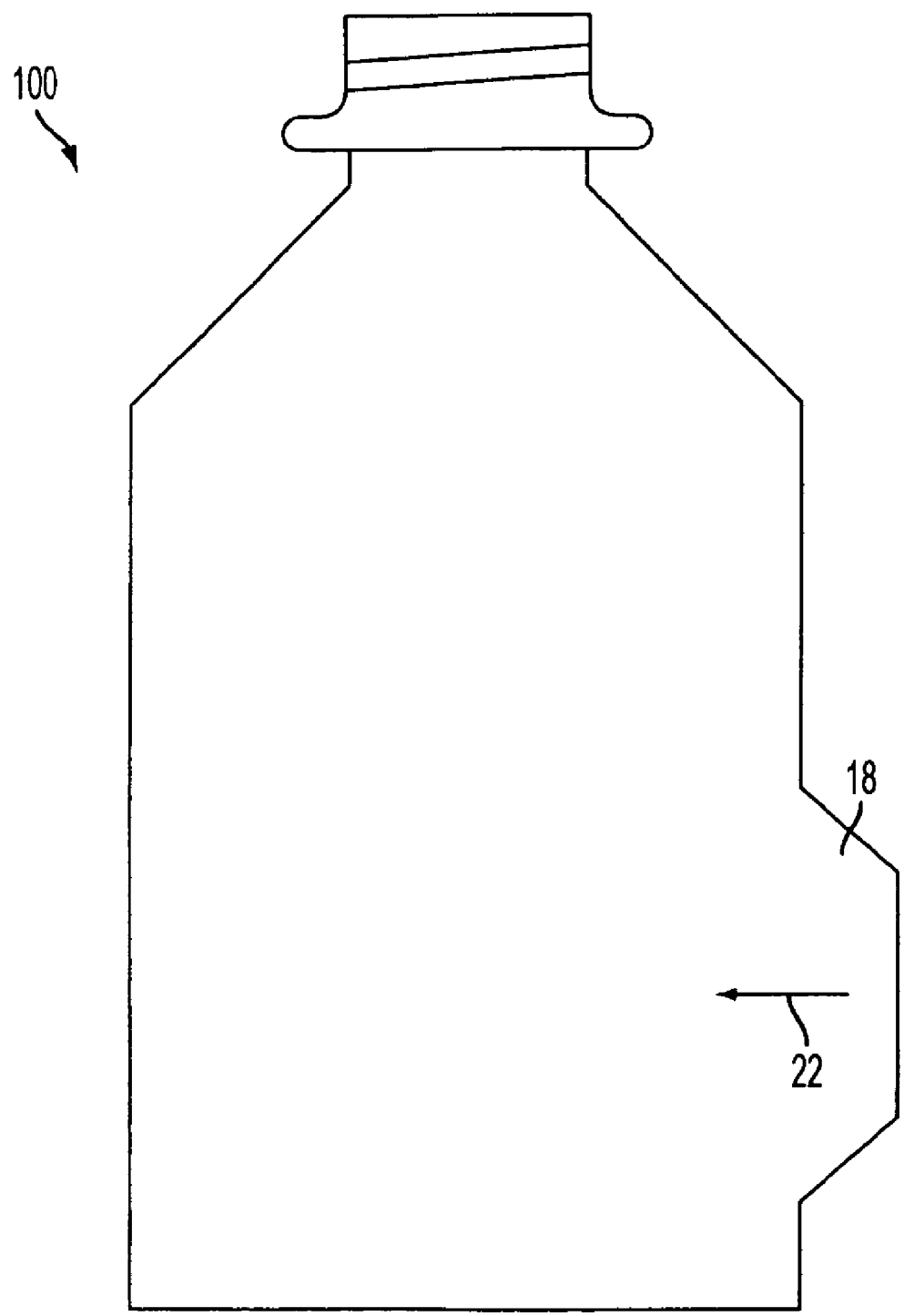
FIGS. 7A-C schematically illustrate the movable region of the exemplary container being inverted after release from the mold.
Figure 7B:
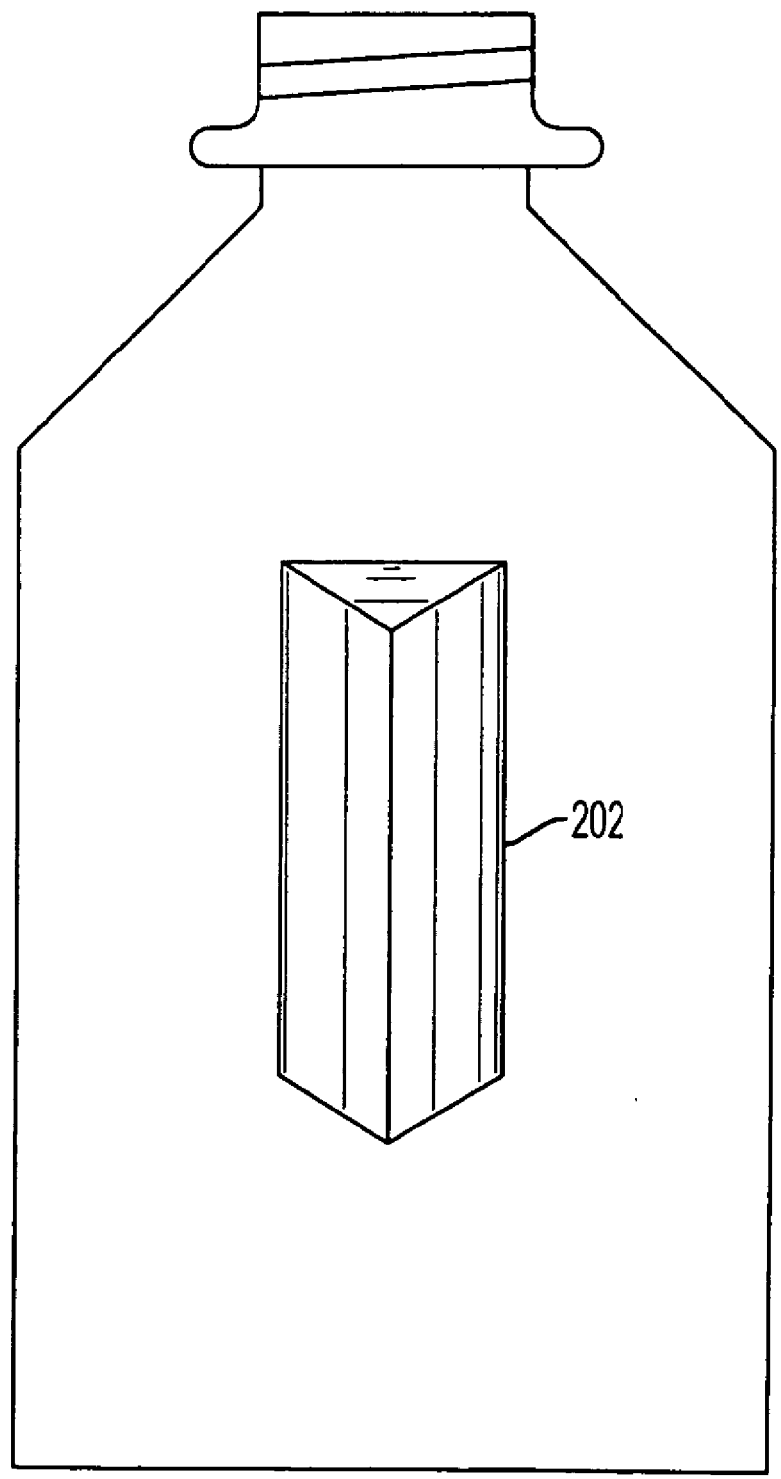

The exemplary embodiments will initially be discussed with reference to FIGS. 1-2. According to an exemplary embodiment of the present invention, container 100 is blow molded into the shape as schematically illustrated in FIG. 7. FIG. 1 illustrates a perspective side view of the exemplary container 100 according to an exemplary embodiment of the present invention. As depicted, the container 100 includes an upper portion 102, a shoulder 104, a container body 106, and a base 108. The upper portion 102 of the container 100 generally is any structure having an opening into the interior of the container 100 and being adapted to receive a closure (not shown). The closure may be any device used to create a substantially air tight seal for a hot-filled product within the container 100, thus substantially preventing air from entering the container 100 through the upper portion 102. In one exemplary embodiment, the upper portion 102 includes threads 114 that are adapted to couple with a closure that is a twist-on cap. The cap may be twisted onto the threads 114 of the upper portion 102 to create a seal with the container 100. In an alternative embodiment, a sealing plug may be placed in the upper portion 102 to seal the container 100. Other closures or seals may be used, as will be appreciated by those of skill in the art.

The shoulder 104 of the container 100 extends from the top of the container body 106 to the bottom of the upper portion 102. Generally, the shoulder 104 narrows as it progresses from the container body 106 to the bottom of the upper portion 102. The shoulder 104 may have any desired shape, or may be omitted from the container 100. The shoulder 104 may include patterns, shapes, and other geometries, or alternatively, may be substantially smooth. In the depicted embodiment, the width of the bottom of the shoulder 104 corresponds to the width of the top of the container body 106, and narrows by curving inward as the shoulder 104 approaches the upper portion 102. The shoulder 104 curves outward before reaching the upper portion 102, and then curves inward as the shoulder 104 reaches the upper portion 102. The shoulder 104 may be other shapes and include other patterns, as will be appreciated by those of skill in the art.

The container body 106 of the container 100 extends from the base 108 to the shoulder 104 and defines an interior of the container 100. The container body 106 is positioned below the shoulder 104. In an alternative embodiment, if the shoulder 104 is omitted from the container 100, the container body 106 extends to the upper portion 102. The container body 106 may be any asymmetrical or symmetrical shape, such as, but not limited to, cylindrical, square, rectangular, or other geometries. Optionally, the container body 106 of the container 100 may include patterned support structure or vacuum panels. The patterned support structure and the vacuum panels may help provide structural integrity for the container 100.

In the depicted embodiment, the container body 106 has ribs 112 positioned at various locations on the container 100. The ribs 112 may be a series of recessed sections alternating with non-recessed sections on the container body 106. The ribs 112 may include other types and shapes and may also be placed at alternate locations on the container body 106, as will be appreciated by those of skill in the art. The ribs 112 may also be omitted from the container body 106, or may be placed at other locations on the container 100.

Figure 6:
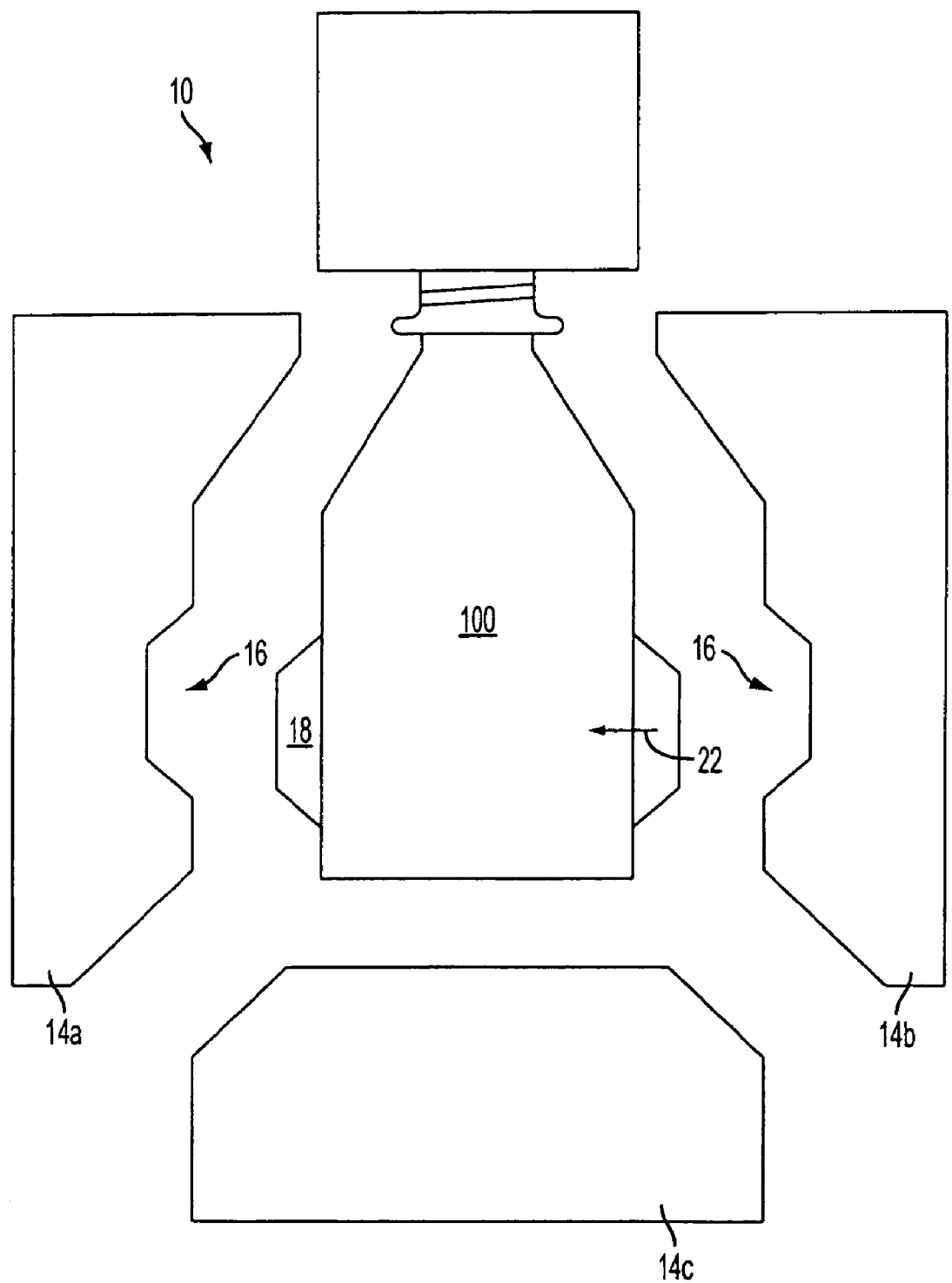
FIG. 6 schematically illustrates another exemplary blow molded container with a movable region being inverted prior to release from the mold-on each side of the container.
Figure 7C:
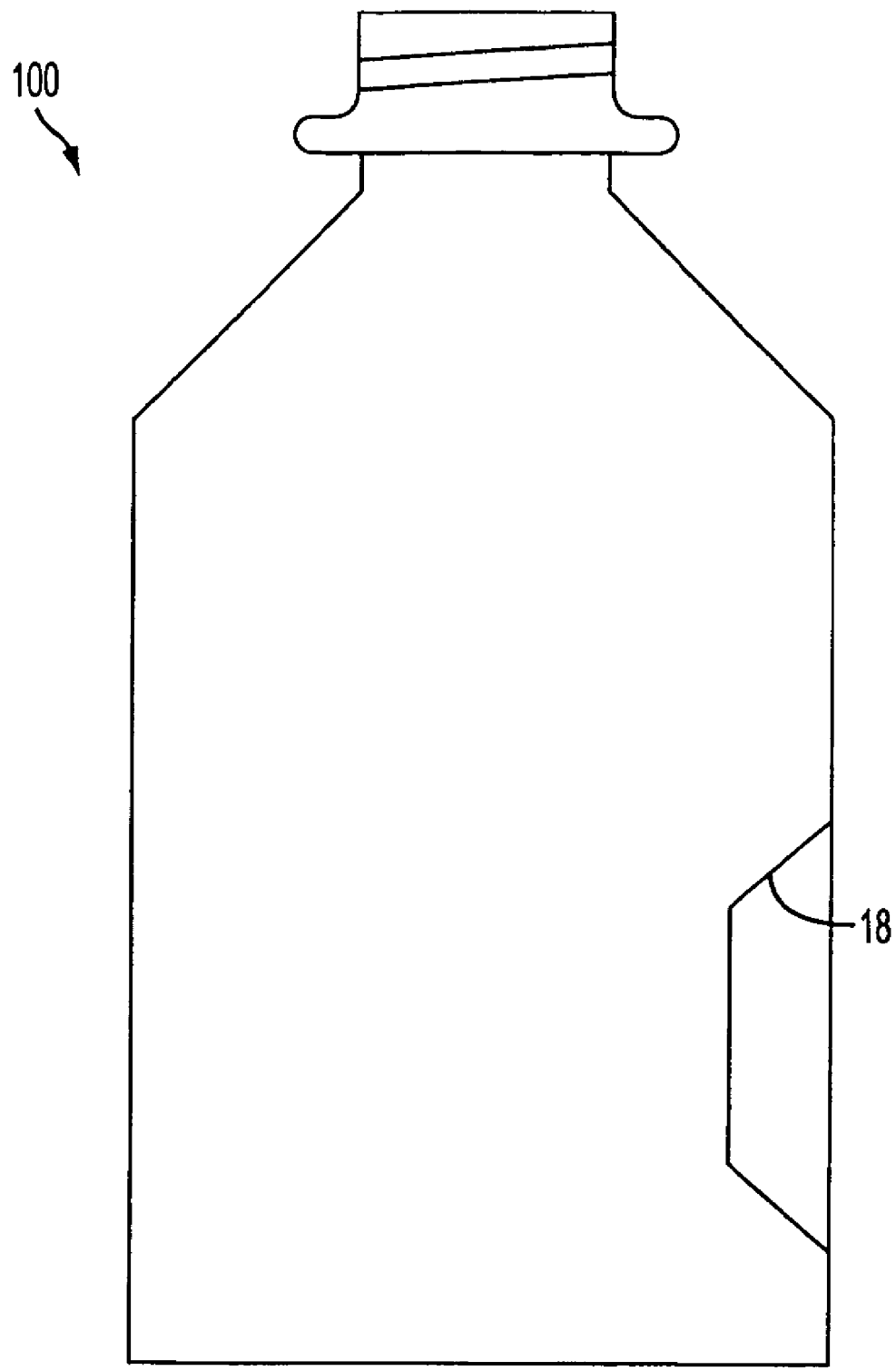

The container body 106 may also include a movable region 110 that initially is blow molded outside of the container 100 (see FIG. 6). The movable region 110 is comprised of a number of surfaces in the grip area of the container body 106. The number of surfaces are arranged in a way so that an external force (arrow 22) acting on the grip area causes the surfaces to fold in relation to one another until such a point where they snap into an inverted position toward the interior of the container 100. As depicted in FIG. 2, the movable region 110 may include a first hinge or seam 202, a first portion 204, a first inner wall 206, a second hinge or seam 214, a second portion 212, a second inner wall 210, a third hinge or seam 208, a fourth hinge or seam 216, and a fifth hinge or seam 218. The first hinge or seam 202 couples the first portion 204 so that portion 204 of the container body 106 is initially blow molded outside the container body 106 and then can be pushed inside the container as shown in FIGS. 3A-B, respectively. The second hinge or seam 214 couples the second portion 212 so that second portion 212 can be pushed inside the container 106 by pivoting about second hinge or seam 214. The fifth hinge or seam 218 couples the first portion 204 with the first inner wall 206, and the fourth hinge or seam 216 couples the second portion 212 with the second inner wall 210 so that these portions can be pushed inside container 106. The inverted movable region 110 is shown in FIG. 3B.

Figure 5:
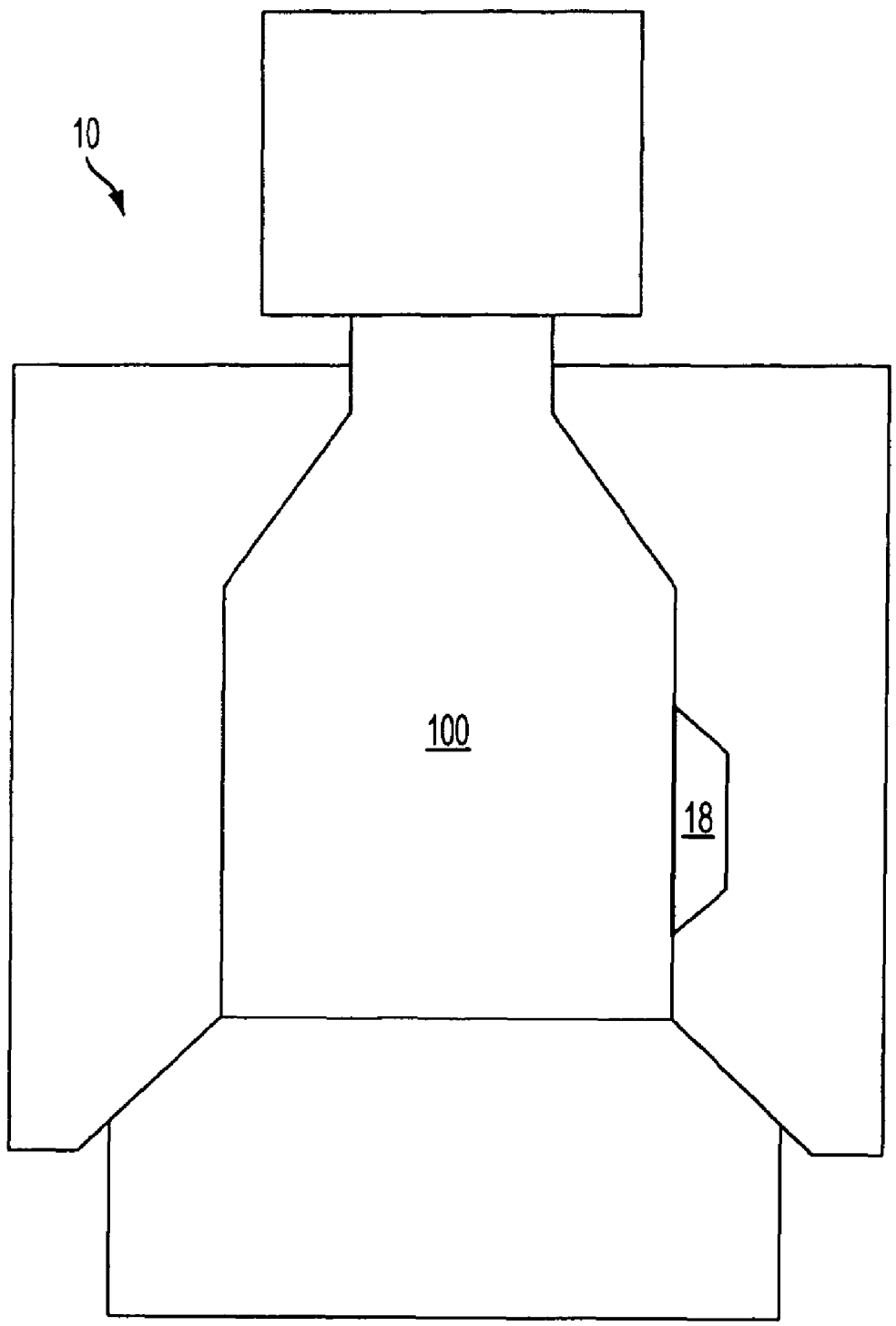
FIG. 5 schematically illustrates an exemplary blow molded container with a movable region according to the invention.

The mold of the container forming assembly shown in FIGS. 4-6 may be made of first and second mold halves 14a, 14b that each may include a wall with a recess to form respective first and second movable gripping regions 110. The gripping regions 110 are initially blown outside the container and then inverted so that a consumer's hand easily fits into the inverted gripping regions.

Initially, when the container 100 is blow molded, the movable region 110 is formed extending away from the interior of the container 100. FIG. 3A illustrates the movable region 110 as blow molded extending away from the interior of the container 100, and FIG. 3B illustrates the movable region 110 extending toward the interior of the container 100 after inversion. During inversion, a force may be applied to cause the movable region 110 to invert. As the force is applied, the first portion 204 rotates about the first hinge or seam 202 and the second portion 212 rotates about the second hinge or seam 214. Additionally, the first portion 204 rotates about the fifth hinge or seam 218 relative to the first inner wall 206, the second portion 212 rotates about the fourth hinge or seam 216 relative to the second inner wall 210, and the first inner wall 206 rotates about the third hinge or seam 208 relative to the second inner wall 210. That is, a many sided movable region 110 is initially blown outside the container thereby avoiding the need for a mold with a deep-set protrusion around which plastic material has difficulty forming the desired thickness about the protrusion. Then, the weights of the plastic at the hinges or seams along with the angles of the first and second portions and the inner walls are designed so that movable region 110 can be inverted into the container to form a deep-set grip(s) that a consumer can securely grip and that has a good ergonomic feel to the consumer. The container wall thickness at the hinges is thinner than the surrounding portions or inner walls, which are heavier as the plastic naturally moves in this manner. The angles of the first and second portions and the inner walls should be sufficiently steep so that the desired depth of a grip is achieved and the desired ergonomic feel.

During inversion, a sufficient force may be applied to the movable region 110 formed outside the container while the container 100 remains within the mold 14a-c (see FIG. 5). As the Assignee of the present invention has successfully inverted projections blown outside the base of the container, enough force needs to be applied to the movable region 110 to cause inversion. In one embodiment, the inversion of the moveable region 18 (110 in FIGS. 1-3B) may occur as late into the blowing process as possible so that the container 100 is allowed to cool as much possible before the container 100 is released or ejected from the mold. The longer the container and movable region can cool, a better inversion result can be achieved. This is because the warmer the container is during inversion, the higher the probability that the container will crease at an undesired location resulting in an aesthetically unpleasing container and thus, a rejected container. The inversion may occur just before the container is ejected or released from the mold to reduce the likelihood that the inversion will form unwanted creases or deformities in the container 100. An air cylinder (not shown) may be used for the inversion of the movable region 110 by applying a force to the first portion 204 and to second inner wall 210. Alternatively, other mechanical, pneumatic, hydraulic, or cam operated means for inverting may be used, as will be appreciated by those skilled in the art. For example, the cam operated means may be included within the mold and the movable region may be inverted while the mold fully encloses the formed container.

The container 100 is blow molded into the shape depicted in FIG. 3A to avoid trapping material in recessed areas of a complex shaped mold and to improve the performance (less rejected containers) of the container 100 at the movable region 110 without increasing the amount of material to the region. The movable region 110 is formed into the shape shown in FIG. 3A to ensure that all surfaces of the movable region are properly formed with sufficient amounts of material and have sufficient definition. An advantage of forming the movable region 110 extending away from the interior of the container is that the rigidity at the movable region 110 is increased by allowing for further orientation of plastic material during the blow molding process (see FIGS. 1, 2, and 3A), as compared with initially forming the container with a deep-set protrusion extending toward the interior of the container (see FIG. 3B). By having the movable region 110 extend away from the interior of the container 100, the orientation of plastic material in the movable region 110 is increased since the mold would not trap material, but would allow the plastic material to further stretch into a cavity of a mold to form the movable region 110 during blow molding. As the orientation of the plastic molecules increases, the molecules straighten and may form a crystalline structure. Typically, the higher the crystallinity of the plastic, the greater the rigidity of the plastic, which improves the structural integrity of the container 100 at the movable region 110. A similar process for increasing orientation is also described in co-pending U.S. Provisional Utility Patent Application No. 60/671,459, filed Apr. 15, 2005, the contents of which are incorporated herein by reference in their entirety.

It is noted that if the container 100 would be initially blow molded into the shape depicted in FIG. 3B, the movable region 110 would not be fully formed at the region near the first hinge or seam 202 and near the second hinge or seam 212. This is the result of forming a container with the stretch blow molding technique. As a container is being stretch blow molded, gas stretches plastic material against a mold for the container, such as a mold for the container 100. If the mold contains a protrusion to form the movable region depicted in FIG. 3B, the plastic material would have to stretch around the protrusion from third hinge or seam 208 down to the region near the first hinge or, seam 202 and near the second hinge or seam 212 (see FIG. 3B). The contact with the mold would trap material at the region near the third hinge or seam 208, and not allow the material to fully form down into the region near the first hinge or seam 202 and near the second hinge or seam 212. Moreover, forming the movable region 110 with such a protrusion would cause plastic to become trapped at the movable region 110, which may prevent other areas of the container to not have sufficient plastic to properly form those areas.

Stretch blow molding the container 100 into the shape as illustrated in FIGS. 1, 2, and 3B also reduces the wall thickness of the movable region 110 and reduces the occurrence of thick amorphous plastic sections near the movable region 110, as compared with forming the container with the movable region 110 extending outwardly from the container as depicted in FIG. 3A. This may allow the amount of plastic material present in the movable region 110 to be reduced without detrimentally affecting container performance, and, in some instances, this technique improves the performance of the movable region. Likewise, forming the container into the shape as illustrated in FIG. 3A may allow a more uniform distribution of plastic material in the base 108. Moreover, the increased rigidity may allow for the inversion of the movable region 110 without a substantial net distortion of the container body 106.

Figure 8:
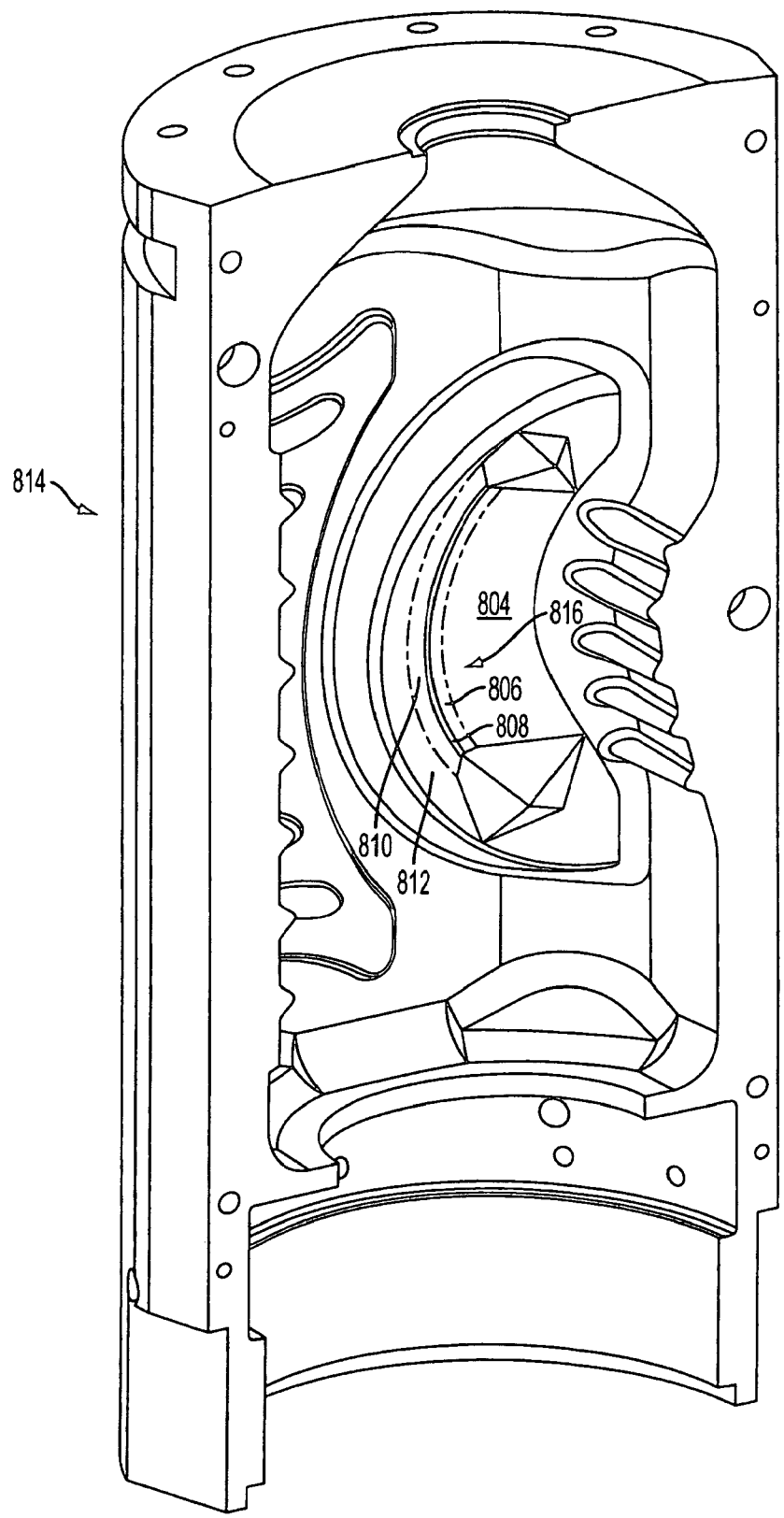
FIG. 8 illustrates a mold for forming half of the container shown in FIG. 1.
Figure 9:
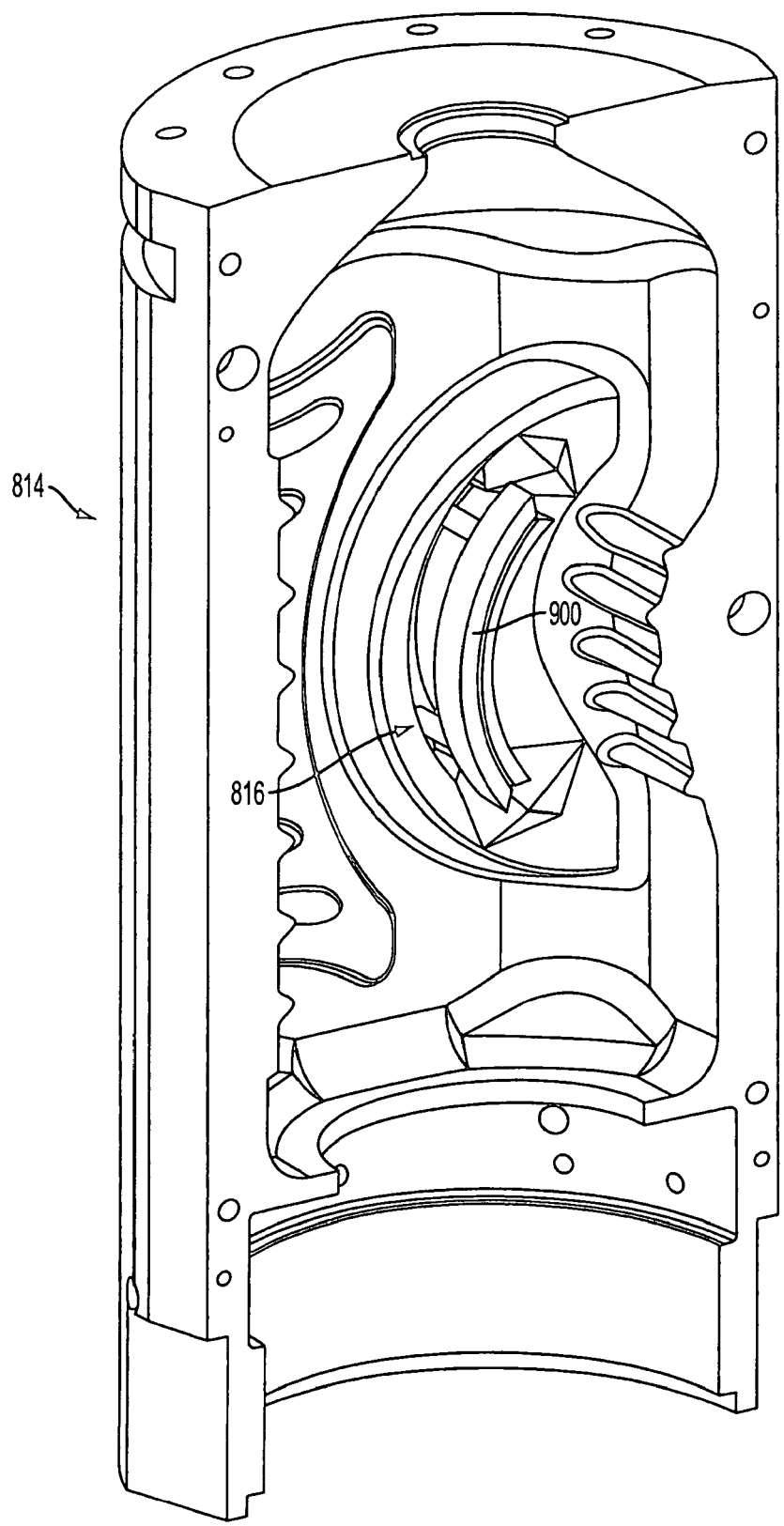
FIG. 9 shows an embodiment of the mold that can be activated to push in an outwardly protruding region toward the center of the container.

FIGS. 4-6 schematically illustrate a container forming assembly for forming a container from a parison according to one embodiment of the invention. The assembly includes a mold 14a, 14b, and 14c that can be driven by a drive mechanism to enclose parison 12. A container 100 is blown within the closed mold assembly, as shown in FIG. 5. A recess 16 may be disposed in a sidewall of mold 14a and mold 14b to form a two sided grip for a container. FIG. 8 illustrates one side of the mold 814 for forming a container as shown in FIG. 11n this embodiment each side mold would include a recess 816 that has a first surface 804 adapted to form a first outer grip portion (204), a second surface 812 adapted to form a second outer grip portion (212), a third surface 806 adapted to form a first inner grip portion (206) adjacent the first outer grip portion (204), a fourth surface 810 adapted to form a second inner grip portion (210), and a fifth surface area 808 adapted to from a ridge area (208) of a movable gripping region 110. The forming assembly may include a first push rod adapted to rotate the first portion 204 of a movable region 110 about first hinge or seam 202 to invert the movable region so that it forms a gripping region. A second push rod may be employed to cause the second portion 212 to rotate about hinge or seam 214 to push both sides of the resultant gripping regions within container 100 prior to filling the container with food product. As shown in FIG. 9, a section 900 of the recess 816 that corresponds with surfaces 806 and 810 and surface area 808 is movable between the inactive position shown in FIG. 8 and the active position shown in FIG. 9.

This system also benefits from requiring less expensive components. While other systems may use complex pneumatic, hydraulic, or cam operated means to push pieces of the mold inward at a specific point in the blow molding cycle, the exemplary embodiments may use a simple mechanical means of inverting the movable region 110. This reduces the cost, molding time, and complexity of the mold set up as compared with conventional systems.

Thus, the container 100 according to exemplary embodiments of the present invention may improve the sufficient rigidity, definition, and performance of the container 100 at a movable region 110 thereby allowing a container to be formed that uses less plastic while maintaining the performance and appearance of the container.

The embodiments and examples discussed herein are non-limiting examples. The shape of the inset are not limited to the examples shown, as the movable region may blown outward in a round or oval forum and, When inverted, still obtain the same function—decrease the volume of the blown container.

The exemplary embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described exemplary embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A container forming assembly for forming from a parison a container having an inverted deep-set gripping region, the container having a first movable gripping region, the first movable gripping region being the inverted deep-set gripping region, the container forming assembly comprising:
   a mold having a wall without a deep protrusion and with a recess adapted to receive a portion of the parison in response to inflation thereof, the recess having a first forming portion adapted to form a first portion of the first movable gripping region and a second forming portion adapted to form a second portion of the first movable gripping region, wherein said first portion is rotatable about a first hinge toward an interior of the container, and said second portion is rotatable about a second hinge toward the interior of the container;
   a drive mechanism adapted to move said mold to enclose the parison during blow molding and to release the container after blow molding; and
   means for moving inwardly the first movable gripping region.

2. The container forming assembly according to claim 1, wherein said means for moving inwardly the first movable gripping region includes:

a first push rod operative to rotate said first portion about said first hinge before filling the container; and
a second push rod operative to rotate said second portion about said second hinge before filling the container.

3. The container forming assembly according to claim 1, wherein the mold includes a first mold half adapted to form the first movable gripping region and a second mold half adapted to form a second movable gripping region, said second movable gripping region having first and second hinges, first and second rotatable portions, and the structure of the first movable gripping region.

4. The container forming assembly according to claim 3, wherein the first and second movable gripping regions are formed in the container so that a consumer's hand easily fits into the inverted gripping regions.

5. The container forming assembly according to claim 3, wherein each of said first and second mold halves comprise:
a movable gripping portion forming region including:
a first surface adapted to form a first outer grip portion of said movable gripping region;
a second surface adapted to form a second outer grip portion of said movable gripping region;
a third surface adapted to form a first inner grip portion of said movable gripping region;
a fourth surface adapted to form a second inner grip portion of said movable griping portion; and
a fifth surface area adapted to form a ridge area of said movable gripping portion.

6. The container forming assembly according to claim 5, wherein said fifth surface area is positioned between said third and fourth surfaces, and wherein said third and fourth surfaces are positioned adjacent to said first and second surfaces, respectively.

7. The container forming assembly according to claim 1, wherein said mold includes one or more vacuum panel forming portions, each of said one or more vacuum forming portions being arranged in a location of said mold different from the recess thereof.

8. The container forming assembly according to claim 1, wherein the first movable gripping region is formed at a base of the container.

9. The container forming assembly according to claim 1, wherein said means for moving inwardly the first movable gripping region is operative to act on the first movable gripping region to cause movement inward of the first movable gripping region so as to reduce an internal volume of the container.

10. The container forming assembly according to claim 1, wherein the recess of said mold is arranged in a side mold portion thereof.

11. The container forming assembly according to claim 1, wherein the recess of said mold is arranged in said mold so as to form a base portion of the container.

12. The container forming assembly according to claim 1, wherein the container forming assembly is operative to invert the first movable gripping region to make the inverted deep-set gripping region of the container while the container is fully enclosed within said mold.

13. The container forming assembly according to claim 1, wherein the recess is adapted to form the first hinge, a wall thickness at the first hinge being thinner than immediately surrounding portions on both sides thereof.

14. A container forming assembly for forming from a parison a container, the container having a first movable gripping region, the container forming assembly comprising:
a mold having a wall with a recess adapted to receive a portion of the parison in response to inflation thereof, the recess having a first forming portion adapted to form a first portion of the first movable gripping region and a second forming portion adapted to form a second portion of the first movable gripping region, wherein said first portion is rotatable about a first hinge toward an interior of the container, and said second portion is rotatable about a second hinge toward the interior of the container;
a drive mechanism adapted to move said mold to enclose the parison during blow molding and to release the container after blow molding; and
means for moving inwardly the first movable gripping region.

15. The container forming assembly according to claim 14, wherein the mold includes a first mold half adapted to form the first movable gripping region and a second mold half adapted to form a second movable gripping region, said second movable gripping region having first and second hinges, first and second rotatable portions, and the structure of the first movable gripping region.

16. The container forming assembly according to claim 14, wherein said mold includes one or more vacuum panel forming portions, each of said one or more vacuum forming portions being arranged in a location of said mold different from the recess thereof.

17. The container forming assembly according to claim 14, wherein the recess of said mold is arranged in a side mold portion thereof.

18. The container forming assembly according to claim 14, wherein the recess of said mold is arranged in said mold so as to form a base portion of the container.

19. The container forming assembly according to claim 14, wherein the container forming assembly is operative to invert the first movable gripping region to make an inverted deep-set gripping region of the container while the container is fully enclosed within said mold.

20. The container forming assembly according to claim 14, wherein the recess is adapted to form the first hinge, a wall thickness at the first hinge being thinner than immediately surrounding portions on both sides thereof.

* * * * *